United States Patent
Winger et al.

(10) Patent No.: US 9,843,815 B2
(45) Date of Patent: Dec. 12, 2017

(54) BASEBAND SIGNAL QUANTIZER ESTIMATION

(71) Applicant: Avago Technologies General IP (Singapore) Pte. Ltd., Singapore (SG)

(72) Inventors: Lowell L. Winger, Waterloo (CA); Ossama E. A. El Badawy, Waterloo (CA); Cheng-Yu Pai, Brossard (CA)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 169 days.

(21) Appl. No.: 14/461,658

(22) Filed: Aug. 18, 2014

(65) Prior Publication Data

US 2015/0003519 A1 Jan. 1, 2015

Related U.S. Application Data

(62) Division of application No. 13/401,983, filed on Feb. 22, 2012, now Pat. No. 8,842,929, which is a division
(Continued)

(51) Int. Cl.
| | |
|---|---|
| *H04N 19/124* | (2014.01) |
| *H04N 19/196* | (2014.01) |
| *H04N 19/80* | (2014.01) |
| *H04N 19/86* | (2014.01) |
| *H04N 19/117* | (2014.01) |

(Continued)

(52) U.S. Cl.
CPC ......... *H04N 19/196* (2014.11); *H04N 19/117* (2014.11); *H04N 19/124* (2014.11); *H04N 19/14* (2014.11); *H04N 19/18* (2014.11); *H04N 19/80* (2014.11); *H04N 19/86* (2014.11)

(58) Field of Classification Search
CPC .... H04N 19/61; H04N 19/176; H04N 19/124; H04N 19/14; H04N 19/147; H04N 19/60; H04N 1/00307
See application file for complete search history.

(56) References Cited

U.S. PATENT DOCUMENTS

| | | | |
|---|---|---|---|
| 5,021,891 A | 6/1991 | Lee | 382/250 |
| 5,537,440 A | 7/1996 | Eyuboglu et al. | 375/245 |

(Continued)

OTHER PUBLICATIONS

Kamaci et al., Frame Bit Allocation for the H.264/AVC Video Coder Via Cauchy-Density-Based Rate and Distortion Models, Aug. 2005 [retrieved Mar. 29, 2016], IEEE Transactions on Circuits and Systems for Video Technology, vol. 15, No. 8, pp. 994-1006. Retrieved from the Internet: http://ieeexplore.ieee.org/xpls/abs_all.jsp?arnumber=1490553&tag=1.*

(Continued)

*Primary Examiner* — Andrew Moyer
*Assistant Examiner* — Dennis Rosario
(74) *Attorney, Agent, or Firm* — Sheridan Ross P.C.

(57) ABSTRACT

A method of deblocking an input signal is disclosed. The method generally includes the steps of (A) calculating a plurality of transform coefficients corresponding to each of a plurality of blocks in the input signal at baseband, (B) calculating a plurality of quantization parameters based on the transform coefficients, at least one of the quantization parameters corresponding to each respective one of the blocks and (C) generating an output signal by deblocking the input signal based on the quantization parameters.

20 Claims, 5 Drawing Sheets

Related U.S. Application Data of application No. 11/947,037, filed on Nov. 29, 2007, now Pat. No. 8,150,187.

(51) Int. Cl.
*H04N 19/14* (2014.01)
*H04N 19/18* (2014.01)

(56) References Cited

U.S. PATENT DOCUMENTS

| | | | | |
|---|---|---|---|---|
| 5,768,534 | A * | 6/1998 | Guillotel | H04N 19/40 375/E7.198 |
| 5,923,813 | A | 7/1999 | Okamoto et al. | 386/208 |
| 5,930,398 | A | 7/1999 | Watney | 382/239 |
| 6,058,383 | A | 5/2000 | Narasimhalu et al. | 705/44 |
| 6,088,393 | A | 7/2000 | Knee et al. | 375/240 |
| 6,895,122 | B2 * | 5/2005 | Jones | H04N 19/86 375/240.2 |
| 7,680,187 | B2 | 3/2010 | Kitamura | 375/240.16 |
| 7,684,632 | B2 | 3/2010 | Samadani | 382/251 |
| 7,729,425 | B2 | 6/2010 | Kato et al. | 375/240.26 |
| 7,940,989 | B2 | 5/2011 | Shi et al. | 382/232 |
| 7,995,800 | B2 * | 8/2011 | Lu | H04N 19/61 382/107 |
| 8,005,306 | B2 | 8/2011 | Kimuar | 382/233 |
| 8,150,187 | B1 * | 4/2012 | Winger | H04N 19/80 382/172 |
| 8,842,929 | B2 * | 9/2014 | Winger | H04N 19/80 375/240.03 |
| 2005/0271288 | A1 | 12/2005 | Suzuki et al. | 382/239 |

OTHER PUBLICATIONS

Neelamani et al., JPEG Compression History Estimation for Color Images, Sep. 14-17, 2003 [retrieved Mar. 29, 2016], 2003 International Conference on Image Processing, vol. 3, pp. III-245-248. Retrieved from the Internet: http://ieeexplore.ieee.org/xpls/abs_all.jsp?arnumber=1247227.*

Shao et al., Coding Artifact Reduction Based on Local Entropy Analysis, Jul. 9, 2007 [retrieved Jul. 31, 2017], IEEE Transactions on Consumer Electronics, vol. 53, Issue: 2, pp. 691-696. Retrieved from the Internet: http://ieeexplore.ieee.org/document/4266960/#full-text-section.*

Feamster et al., An MPEG-2 to H.263 Transcoder [on-line], Nov. 22, 1999 [retrieved on Nov. 27, 2013], Proc. SPIE 3845, Multimedia Systems and Applications II, vol. 3845, pp. 164-175. Retrieved from the Internet: http://proceedings.spiedigitallibrary.org/proceeding.aspx?articleid-908733.

Fan et al., Maximum Likelihood Estimation of JPEG Quantization Table in the Identification of Bitmap Compression History [on-line], 2000 [retrieved on Apr. 4, 2013], 2000 International Conference on Image Processing, vol. 1, pp. 948-951. Retrieved from the Internet: http://ieeexplore.ieee.org/xpls/abs_all.jsp?amumber=901117&ag=1.

Wang et al., "Proceeding of the 8$^{th}$ Workshop on Multimedia and Security 2006: Exposing Digital Forgeries in Video by Detecting Double MPEG Compression", Sep. 26-27, 2006, ACM, pp. 37-47.

Langelaar et al., "Optimal Differential Energy Watermarking of DCT Encoded Images and Video, Jan. 2001, IEEE Transactions on Image Processing", vol. 10, No. 1, pp. 148-158.

* cited by examiner

BASEBAND SIGNAL QUANTIZER ESTIMATION

This application relates to U.S. Ser. No. 13/401,983, filed Feb. 22, 2012, which relates to U.S. Ser. No. 11/947,037, filed Nov. 29, 2007, now U.S. Pat. No. 8,150,187, which are incorporated by reference in their entirety.

FIELD OF THE INVENTION

The present invention relates to signal quality improvements generally and, more particularly, to a method and/or apparatus for implementing a baseband signal quantizer estimation.

BACKGROUND OF THE INVENTION

Estimating a "quality" of a baseband video (i.e., frames and/or fields and/or sub-portions of frames/fields) or images or audio signals (i.e., pixel domains, not bitstreams) that may have been previously compressed and then subsequently decompressed using transformed-based techniques is difficult. Further difficulties arise in estimating what quantizer or maximum quantizer was applied to the video/image/audio signals if the baseband signals were previously compressed and then decompressed in multiple previous generations. The absence of compression information in the baseband signals leaves the blockiness of the video/image signals and the amount of mosquito noise (i.e., Gibbs artifacts) in video/image signals hard to estimate quantitatively.

Existing techniques to estimate the quantizer qualities and/or quantities from baseband signals use comparisons of pixels and/or sample differences at different regular intervals (i.e., modulo the suspected transform-size) in a pixel/sample domain. However, the existing techniques are easily confused by edges existing in the content itself. Therefore, the existing techniques are inaccurate. Furthermore, the existing techniques are incapable of providing any kind of accurate estimation of quantizer values, let alone accurate tracking of the quantizer values over time as rate-control varies the quantizer values while compressing. A practical disadvantage is that if the estimated quality (i.e., blockiness/quantizer/quality) is used for processing of the baseband signal, then poor results are commonly obtained.

SUMMARY OF THE INVENTION

The present invention concerns a method of deblocking an input signal. The method generally comprises the steps of (A) calculating a plurality of transform coefficients corresponding to each of a plurality of blocks in the input signal at baseband, (B) calculating a plurality of quantization parameters based on the transform coefficients, at least one of the quantization parameters corresponding to each respective one of the blocks and (C) generating an output signal by deblocking the input signal based on the quantization parameters.

The objects, features and advantages of the present invention include providing a baseband signal quantizer estimation that may (i) provide deblocking of a baseband signal, (ii) extract forensic information from the baseband signal, (iii) provide noise filtering of the baseband signal, (iv) enable accurate application of a variable deblocking strength and/or (v) operate on several channels of the baseband video signal independently.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally provides baseband signal quantizer estimations for video, still images and/or audio signals. The resulting quantization parameter (QP) information may be used in pre-processing and/or post-processing of the baseband signals for deblocking, mosquito noise removal and/or sharpening. Forensic analysis of the baseband signals may be based on the quantization parameters QP to determine information about the history of the processing applied to the signal. Watermark extraction may be enabled by using information about the compression applied to accurately determine the present/absence of a watermark for purposes of copyright enforcement. Furthermore, the forensic analysis may be used to detect patent infringement, certifying data path integrity, certifying quality guarantees and/or for determining data authenticity.

Accurate tracking of the quantization parameters QP generally enables strong deblocking near events that cause large increases in the video quantization parameters QP (e.g., scene changes, camera flashes, etc.) while accurately using weak deblocking for sections of the video that use relatively smaller quantization parameters QP. The present invention may be applicable to, but is not limited to, MPEG-2 video, MPEG-4 Part 2 video, DV video, JPEG images, AAC audio, MP3 audio and other signals using transform-based compressions and decompressions. Potential implementations include, but are not limited to, professional encoding equipment, consumer equipment and transcoders.

The following examples generally assume an 8×8 grid having a position known a priori. The examples generally consider the luminance components of signals, but may be applied to the chrominance components as well. The estimated quantization parameters QP may be used to drive a deblocker, noise filter, forensic function and/or other signal processing operations.

Figure 1:
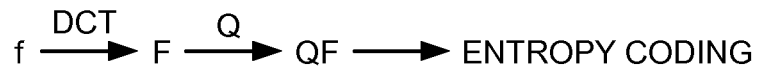
FIG. 1 is a flow diagram of a conventional MPEG-2 coding.

Referring to FIG. 1, a flow diagram of a conventional MPEG-2 coding is shown. An MPEG-2 transform coding generally works by transforming a block of time domain samples (e.g., f) into multiple Discrete Cosine Transform (DCT) coefficients (e.g., F). The DCT coefficients may then be quantized (Q) to create quantized DCT coefficients (e.g., QF). The quantized DCT coefficients may then be entropy coded to generate a bitstream. The relation between each of the AC coefficients among the DCT coefficients (the DC coefficient is quantized differently) and the respective quantized versions QF may be given by equation 1 as follows:

$$QF = \frac{F}{w \frac{qscale}{16}} \qquad \text{Eq. (1)}$$

where "w" may be the weight corresponding to the AC DCT coefficient in the quantization matrix and "qscale" may be the quantization parameter, also referred to as "QP" for short.

Figure 2:
FIG. 2 is a flow diagram of a conventional MPEG-2 decoding.

Referring to FIG. 2, a flow diagram of a conventional MPEG-2 decoding is shown. An MPEG-2 transform decoding generally works by entropy decoding the bitstream to recover the quantized DCT coefficients QF. An inverse quantization (iQ) may then be used to generate an estimated version of the DCT coefficients (e.g., F'). An inverse DCT transformation (iDCT) generally converts the DCT coefficients into an estimated version of the original block of time domain samples (e.g., f'). The quantization parameter QP is generally a good estimate of the amount of blockiness in the video.

The quantization parameter QP may be calculated from the estimated DCT coefficients F'. For example, the three lowest frequency AC coefficients (e.g., a first horizontal coefficient, a vertical coefficient and a diagonal coefficient) may be used to in calculating the quantization parameter QP. Corresponding weights w of the three lowest AC coefficients in a default MPEG-2 quantization matrix may each be 16. Equation 1 therefore becomes equation 2 as follows:

$$QF = \frac{F}{qscale} \qquad \text{Eq. (2)}$$

The decoding process generally uses equation 3 to calculate F' from QF, as follows:

$$F' = QF \times qscale \qquad \text{Eq. (3)}$$

Assuming a baseband video signal originates from a decoded MPEG-2 content, the following are generally true (i) the DCT may be based on 8×8 blocks, (ii) the quantization parameter QP may be constant, at least for the 4 luminance blocks inside a macroblock, and (iii) at least 3 low frequency AC DCT coefficients exist in each of the 8×8 blocks. For a given intra-coded macroblock, multiple equations (e.g., 12 equations) may exist as shown in equation 4 as follows:

$$F'_{ij} = (QF)_{ij} \times qscale \qquad \text{Eq. (4)}$$

where $1 \leq i \leq 4$ may denote the ith block within the macroblock under consideration and $1 \leq j \leq 3$ may denote horizontal, vertical, and diagonal low frequency AC DCT coefficient for block i. Assuming a baseband video that is aligned with the grid, the estimated DCT coefficients $F'_{ij}$ may be computed from the time domain samples $f'_{ij}$ per equations 5 thru 7 as follows:

$$F'_{i1} = \frac{1}{4} \frac{1}{\sqrt{2}} \frac{1}{\sqrt{2}} \sum_{x=0}^{7} \sum_{y=0}^{7} f'_i(x, y) \cos\frac{(2y+1)\pi}{16} \qquad \text{Eq. (5)}$$

$$F'_{i2} = \frac{1}{4} \frac{1}{\sqrt{2}} \frac{1}{\sqrt{2}} \sum_{x=0}^{7} \sum_{y=0}^{7} f'_i(x, y) \cos\frac{(2x+1)\pi}{16} \qquad \text{Eq. (6)}$$

$$F'_{i3} = \frac{1}{4} \sum_{x=0}^{7} \sum_{y=0}^{7} f'_i(x, y) \cos\frac{(2x+1)\pi}{16} \cos\frac{(2y+1)\pi}{16} \qquad \text{Eq. (7)}$$

Any of the above 12 equations alone generally cannot be used to "reverse-engineer" the quantization parameter QP, since recovery of $QF_{ij}$ may not be possible. However, by looking at the 12 equations collectively, an estimation may be performed to calculate what the quantization QP might have been. Having more than 12 equations per macroblock may result in even a better estimation. Such an estimation may be possible if the quantization parameter QP is assumed not to change from one macroblock to the next macroblock.

Figure 3:
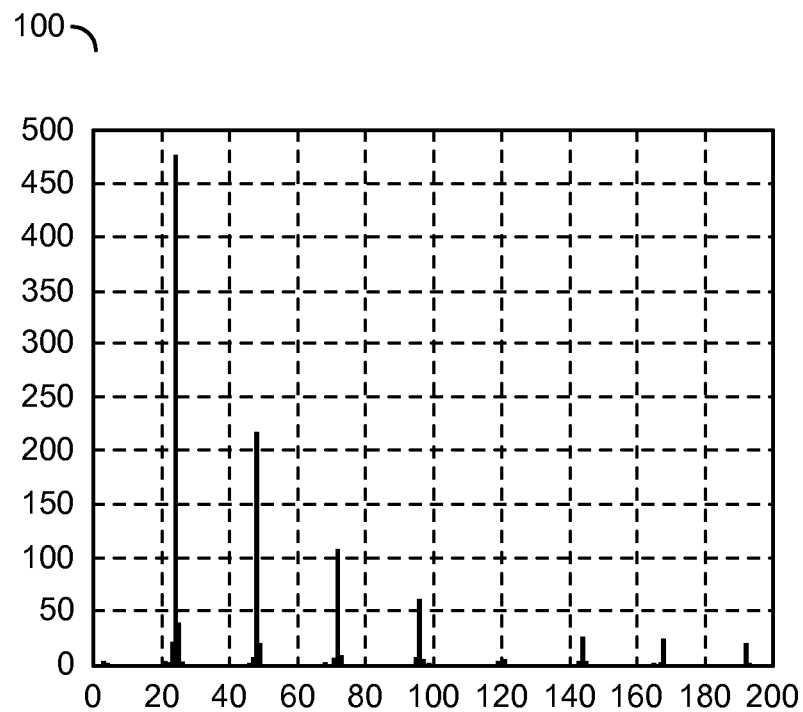
FIG. 3 is a histogram of first example positive estimated DCT coefficients in an I-frame having a constant quantization parameter QP of 24.

Referring to FIG. 3, a histogram 100 of first example positive estimated DCT coefficients in an Intra-coded frame (I-frame) having a constant quantization parameter QP of 24 is shown. The histogram generally peaks at multiples of the quantization parameter QP. A highest peak may occur at a first quantization level.

Figure 4:
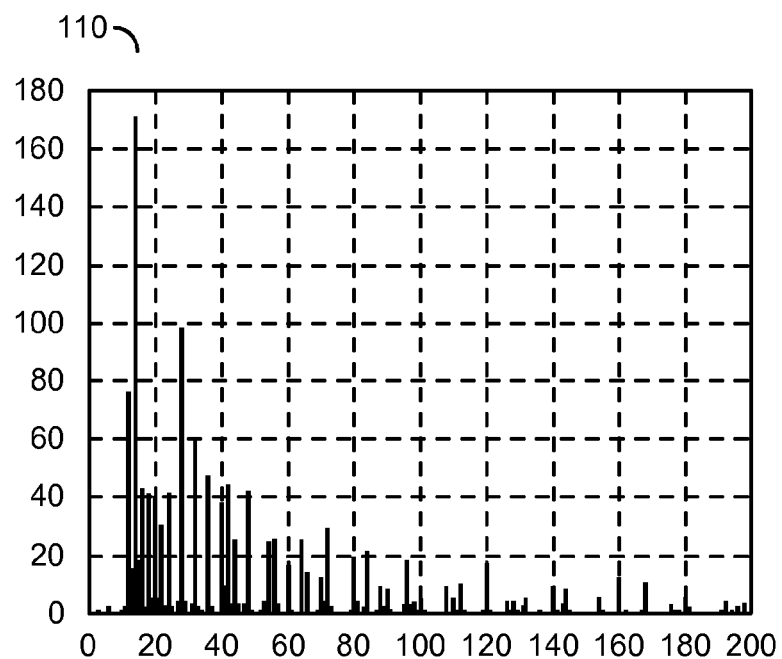
FIG. 4 is a histogram of second example positive estimated DCT coefficients in an I-frame having an average quantization parameter QP of 16.

Referring to FIG. 4, a histogram 110 of second example positive estimated DCT coefficients in an I-frame having an average quantization parameter QP of 16 is shown. In practice, the quantization parameter QP may not be fixed for a whole frame. However, a high peak corresponding to an average quantization parameter QP generally exists around the first (or initial) quantization level. Furthermore, the peak at the first quantization level is usually the biggest within the histogram. FIG. 4 generally shows the histogram of a positive $F'_{ij}$ for the same I-frame as in FIG. 3 coded without forcing the quantization parameter QP to a single value. In FIG. 4, the average quantization parameter QP for the frame is 16. The histogram shows that first peak may be very close to 16. As such, the location of the first histogram peak may be used as an estimate for the underlying quantization parameter QP value.

Figure 5:
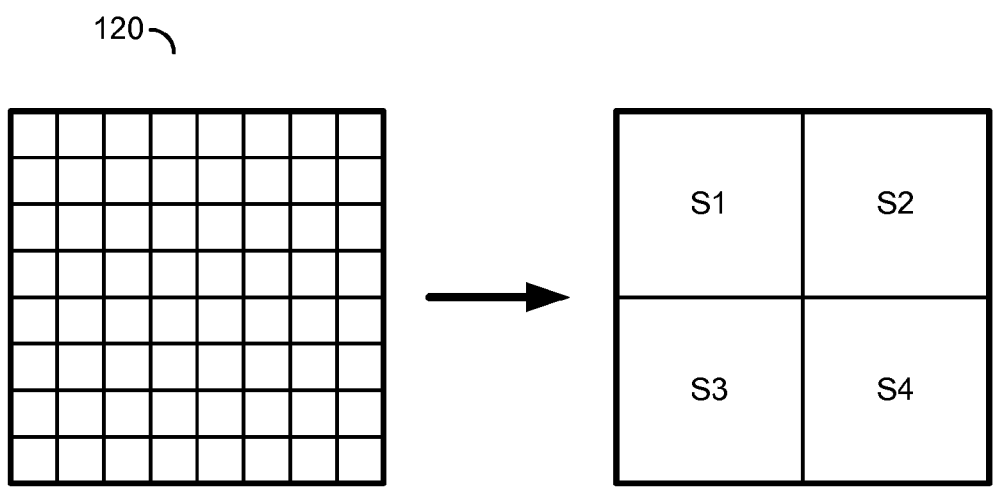
FIG. 5 is a diagram of an example block.

Referring to FIG. 5, a diagram of an example block 120 is shown. An estimation of the quantization parameter QP may be made from a 4×4 matrix of the four DC values of the block 120. Considering the four 4×4 blocks of the block 120, where each square may represent a pixel sample, let $S_i$ for $1 \leq i \leq 4$ be a sum of absolute differences in the ith 4×4 sub-block. Therefore, equations 8 thru 10 may be used to calculate the estimated DCT coefficients $F'_{ij}$ as follows:

$$F'_{i1} \approx \frac{1}{8}(S_1 + S_2) - (S_3 + S_4) \qquad \text{Eq. (8)}$$

$$F'_{i2} \approx \frac{1}{8}(S_1 + S_3) - (S_2 + S_4) \qquad \text{Eq. (9)}$$

$$F'_{i3} \approx \frac{1}{4}(S_1 + S_4) - (S_2 + S_3) \qquad \text{Eq. (10)}$$

The above equations may be rearranged in two ways so that some of the additions may be "reused", thus saving some processing cycles, as equations 11 thru 13 as follows:

$$F'_{i1} \approx \frac{1}{8}(S_1 - S_4) + (S_2 - S_3) \qquad \text{Eq. (11)}$$

-continued $$F'_{i2} \approx \frac{1}{8}(S_1 - S_4) + (S_3 - S_2) \quad \text{Eq. (12)}$$

$$= \frac{1}{8}(S_1 - S_4) - (S_2 - S_3)$$

$$F'_{i3} \approx \frac{1}{4}(S_1 + S_4) - (S_2 + S_3) \quad \text{Eq. (10)}$$

By eliminating the coefficients $F'_{i3}$, an estimate of the four DC values may be calculated using only three subtractions and one addition. The approximations effectively model the cosine with a Haar-like basis function (e.g., the cosine may be approximated with 1 whenever positive, and −1 whenever negative).

Figure 6:
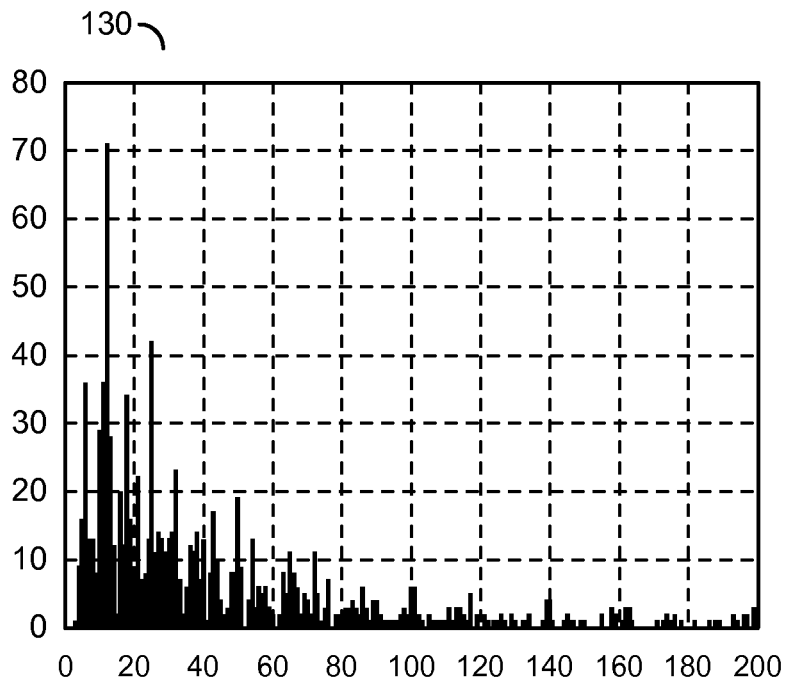
FIG. 6 is a histogram of third example positive estimated DCT coefficients for the I-frame of FIG. 4.

Referring to FIG. 6, a histogram 130 of third example positive estimated DCT coefficients for the I-frame of FIG. 4 is shown. The histogram only uses the estimated DCT coefficient $F'_{i1}$ and $F'_{i2}$. Using only some of the estimated DCT coefficients generally produces lower counts in the histogram. For example, the first peak may slightly underestimate the average quantization parameter QP of 16, which may be compensated.

Figure 7:
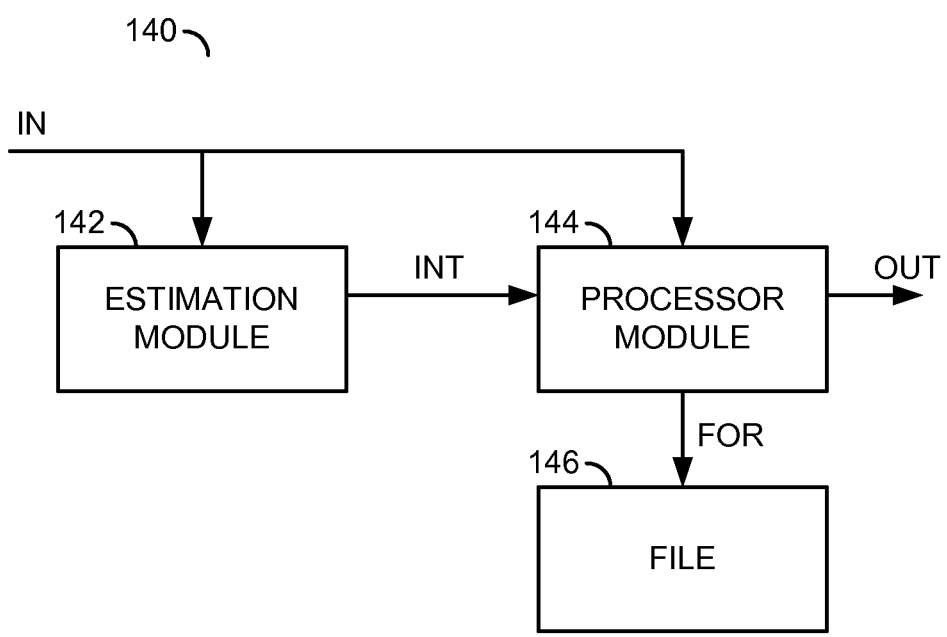
FIG. 7 is a block diagram of an example implementation of an apparatus in accordance with a preferred embodiment of the present invention.

Referring to FIG. 7, a block diagram of an example implementation of an apparatus 140 in accordance with a preferred embodiment of the present invention is shown. The apparatus (or system) 140 may be used to implement the techniques of the present invention as disclosed above. The apparatus 140 generally comprises a circuit (or module) 142, a circuit (or module) 144 and an optional circuit (or module) 146. An input signal (e.g., IN) may be received by the circuit 142 and the circuit 144. An intermediate signal (e.g., INT) may be presented from circuit 142 to the circuit 144. The circuit 144 may generate and present an output signal (e.g., OUT). In some embodiments, a forensic signal (e.g., FOR) may be presented from the circuit 144 to the circuit 146.

The circuit 142 generally implements a quantization parameter estimation operation. The circuit 142 may be operational to estimate (calculate) one or more quantization parameter QP values based on the signal IN. The quantization parameter QP values may be carried in the signal INT to the circuit 144.

The circuit 144 may implement a signal processor. The circuit 144 is generally operational to process the signal IN based on the quantization parameters QP received in the signal INT to generate the signal OUT. The processing may include, but is not limited to, deblocking, noise filtering and/or forensic analysis. In embodiments generating forensic data, the circuit 144 may be operational to transmit the forensic information in the signal FOR to the circuit 146.

The circuit 146 may implement a storage medium. The circuit 146 may be operational to store the forensic data received in the signal FOR to enable subsequent playback and further analysis. The circuit 146 may be implemented as a magnetic, solid state and/or optical storage medium. Other storage technologies may be implemented to meet the criteria of a particular application.

The signal IN may implement a digital video signal, a digital still image signal or a digital audio signal. The signal IN may be received by the circuit 142 and the circuit 144 as a baseband signal. A previous transform-based compression and later decompression of the signal IN may have taken place prior to reception by the apparatus 140.

The signal OUT may also be implemented as the digital video signal, the digital still image or the digital audio signal. The signal OUT may be a processed version of the signal IN. The processing is generally based on the quantization parameters QP extracted from the signal IN by the circuit 142.

Figure 8:
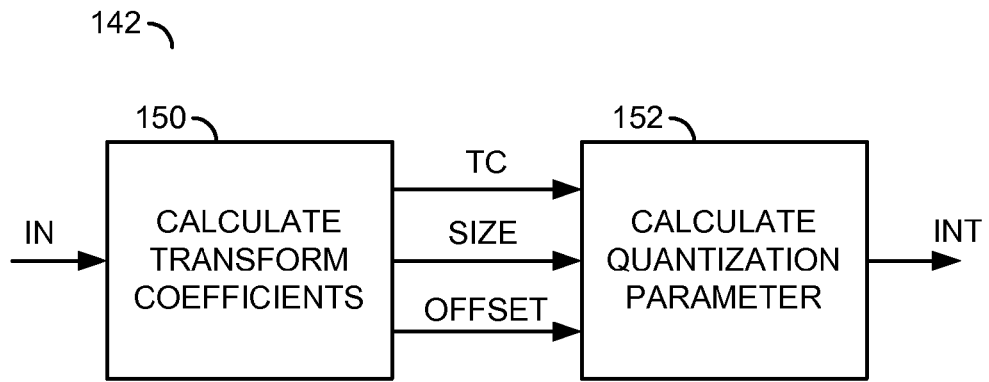
FIG. 8 is a detailed block diagram of an example implementation of a quantization coefficient estimation circuit.

Referring to FIG. 8, a detailed block diagram of an example implementation of the circuit 142 is shown. The circuit 142 generally comprises a circuit (or module) 150 and a circuit (or module) 152. The module 150 may receive the signal IN. An estimated transform coefficient signal (e.g., TC) may be generated and presented from the circuit 150 to the circuit 152. A signal (e.g., SIZE) may be generated and presented from the circuit 150 to the circuit 152. A signal (e.g., OFFSET) may also be generated and presented from the circuit 150 to the circuit 152. The signal INT may be generated and presented from the circuit 152.

The circuit 150 may be operational to estimate the transform coefficients from the signal IN. The transform coefficients may be based on a fixed block size in known locations. Estimating the transform coefficients may be based on one or more of the following: (i) using block average differences of the baseband signal (e.g., a Hardamard transform), (ii) two or more of the lowest frequency AC coefficients, (iii) using one or more gaps between two peaks in a coefficient histogram, (iv) using a gap between the origin and the initial peak (or a subsequent peak) in the coefficient histogram and (v) using histograms of 4×4 DC block differences. The lowest AC coefficients are generally the most accurate for low bitrate signals that may not contain many high-frequency coefficients (e.g., the high frequency coefficients may have been quantized to zero.)

The coefficient estimations may also be used to determine a block-grid alignment and/or blockiness of the signal by estimating over multiple different options (e.g., different block sizes and different block offsets) and determining which option yields the best separated histogram (e.g., the histogram with the highest peaks and/or the best separation between peaks.) The varying block sizes may be reported in the signal SIZE with reporting the respective transform coefficients in the signal TC. In one or more embodiments, the circuit 150 may also be operational to calculate an offset of the blocks from a standard location. The block offsets may be reported in the signal OFFSET along with the reporting of the respective transform coefficients. While the embodiments generally describe estimations based on the luminance components of the signal, the estimations may also be applied to both chrominance channels (e.g., U and V). In some embodiments, (e.g., an H.264 compressed/decompressed signal) may permit the use of a quantization parameter QP offset between the chrominance channels and the luminance channel.

The circuit 152 may be operational to calculate the estimated quantization parameters QP based on the transform coefficients, the one or more block sizes and the offset, if applicable. For each macroblock, up to 12 transform coefficients may be considered in the calculations. The estimated quantization parameters QP may be presented to the circuit 144 in the intermediate signal INT.

Figure 9:
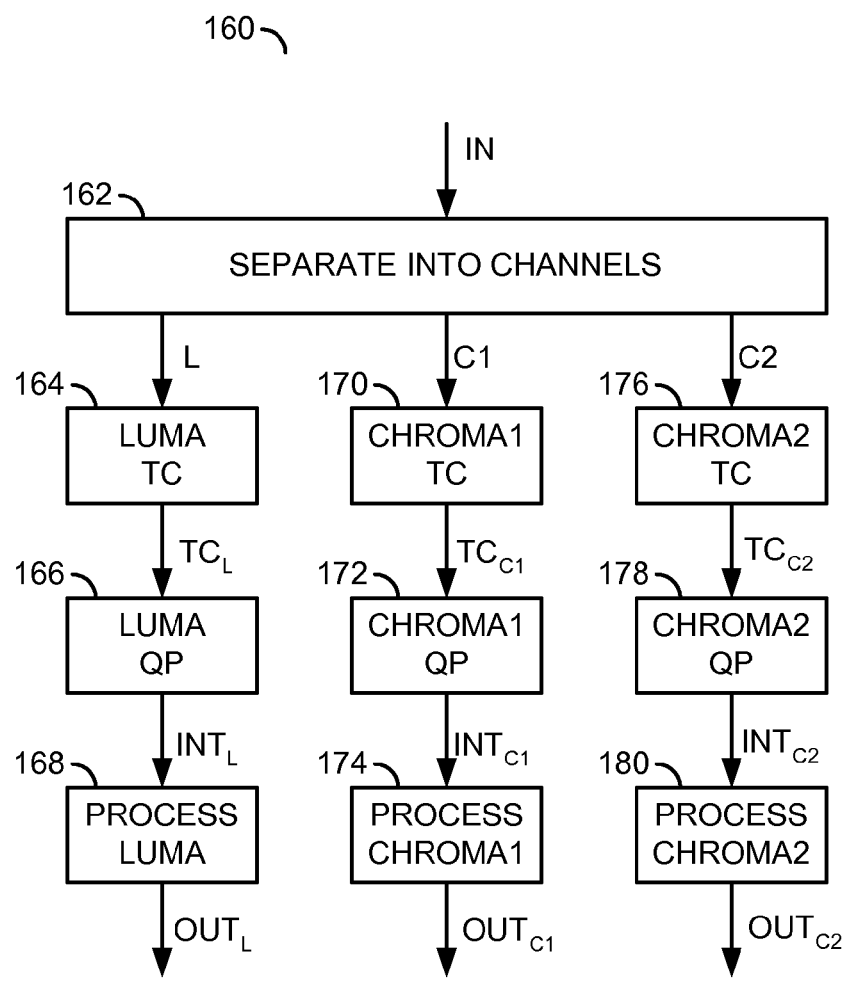
FIG. 9 is a flow diagram of an example method of analyzing the baseband signal.

Referring to FIG. 9, a flow diagram of an example method 160 of analyzing the baseband signal IN is shown. The method (or process) 160 may be implemented by the apparatus 140. The method 160 generally comprises a step (or block) 162, a step (or block) 164, a step (or block) 166, a step (or block) 168, a step (or block) 170, a step (or block) 172, a step (or block) 174, a step (or block) 176, a step (or block) 178 and a step (or block) 180.

In the step 162, the signal IN may be parsed into a luminance channel and multiple (e.g., 2) chrominance channels by the circuit 150. The circuit 150 may examine the luminance channel of the signal IN to determine one or more luminance transform coefficients (e.g., $TC_L$) in the step 164. In the step 166, the circuit 152 may calculate a quantization parameter (e.g., $QP_L$) for the luminance channel. The luminance quantization parameter $QP_L$ may be presented to the circuit 144 for further processing in the step 168. The processed luminance channel may be presented in a signal (e.g., $OUT_L$).

In the step 170, the circuit 150 (or a copy of the circuit 150) may examine a first chrominance channel of the signal IN to determine one or more chrominance transform coefficients (e.g., $TC_{C1}$). In the step 172, the circuit 152 (or a copy of the circuit 152) may calculate a quantization parameter (e.g., $QP_{C1}$) for the first chrominance channel. The first chrominance channel quantization parameter $QP_{C1}$ may be presented to the circuit 144 for further processing in the step 174. The processed first chrominance channel may be presented in a signal (e.g., $OUT_{C1}$).

In the step 176, the circuit 150 (or a copy of the circuit 150) may examine a second chrominance channel of the signal IN to determine one or more chrominance transform coefficients (e.g., $TC_{C2}$). In the step 178, the circuit 152 (or a copy of the circuit 152) may calculate a quantization parameter (e.g., $QP_{C2}$) for the second chrominance channel. The second chrominance channel quantization parameter $QP_{C2}$ may be presented to the circuit 144 for further processing in the step 180. The processed second chrominance channel may be presented in a signal (e.g., $OUT_{C2}$).

Figure 10:
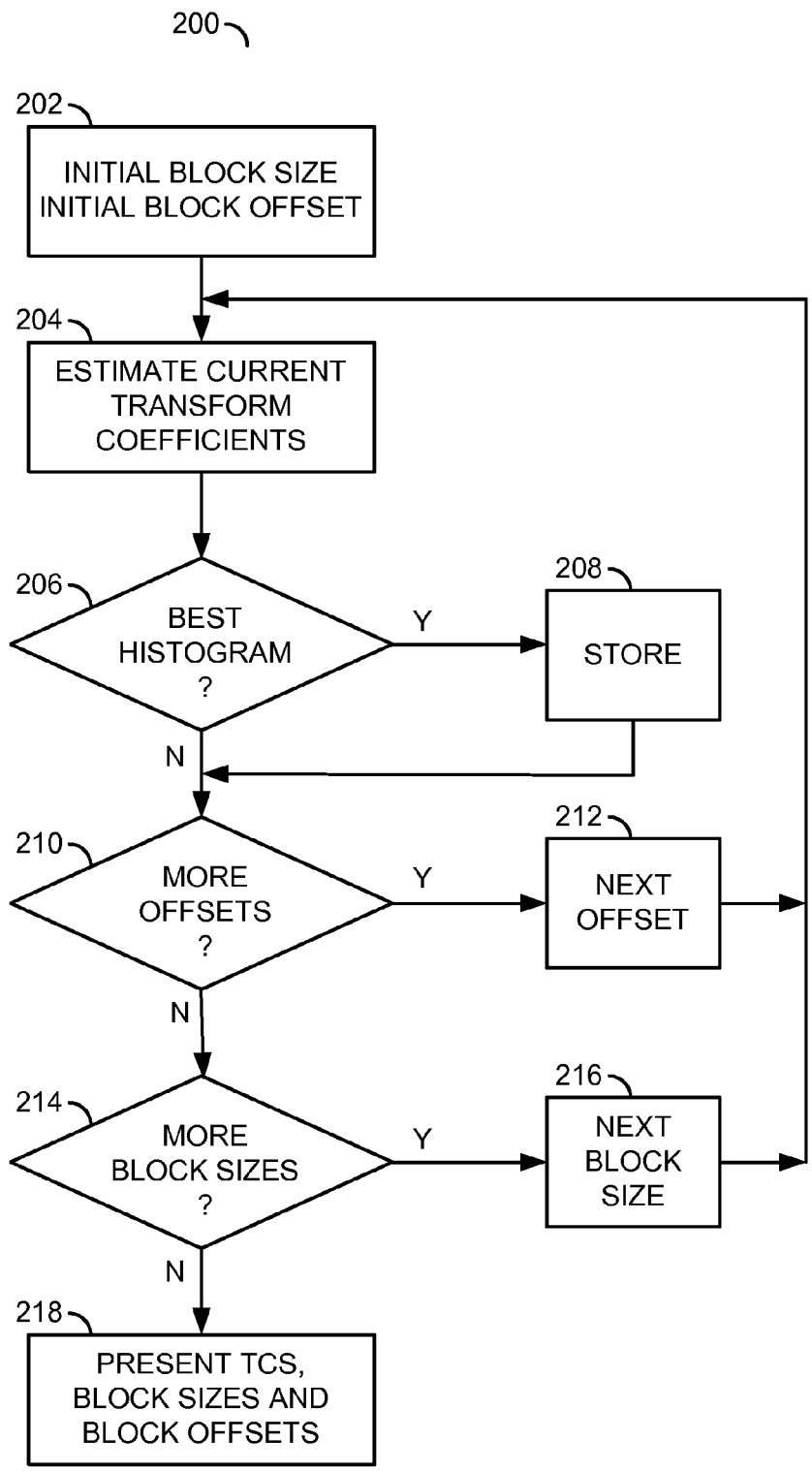
FIG. 10 is a flow diagram of an example method to determine a best block size and a best block offset.

Referring to FIG. 10, a flow diagram of an example method 200 to determine a best block size and a best offset is shown. The method (or process) 200 may be implemented by the apparatus 140. The method 200 generally comprises a step (or block) 202, a step (or block) 204, a step (or block) 206, a step (or block) 208, a step (or block) 210, a step (or block) 212, a step (or block) 214, a step (or block) 216 and a step (or block) 218.

In the step 202, the apparatus 140 may initialize the process by setting (i) a current block size to an initial block size and (ii) a current block offset to an initial block offset from a reference grid. The circuit 142 may calculate a first set of transform coefficients corresponding to the current block size and the current block offset in the step 204. A check may be made by the circuit 142 in the step 206 to see if the resulting set of transform coefficients result in a best histogram. If the current histogram is a best histogram (e.g., the YES branch of step 206), the circuit 142 may store the current block size and the current block offset in the step 208.

If either the current histogram is the best histogram (e.g., the step 208) or a better histogram has already been stored (e.g., the NO branch of step 206), the circuit 142 may check for a next block offset. If another block offset is available to try (e.g., the YES branch of step 210), the method 200 may continue with estimating the transform coefficients in the step 204. Once all of the block offsets for a given block size have been checked (e.g., the NO branch of step 210), the method 200 may continue by checking additional block sizes.

If more block sizes are available to be checked (e.g., the YES branch of step 214), a next block size may be selected in the step 216. Once all of the block sizes have been tried (e.g., the NO branch of step 214), the circuit 142 may output the transform coefficient values, block size value and block offset value corresponding to the best histogram in the step 218.

The following Octave script may be used to simulate the above techniques. GNU Octave (http://www.octave.org) is open source code and is generally compatible with Mat-lab.

```
Q(Pest.m) =
    more off
    nChromaFormat = 420;
    sPath = '../path/to/yuv/file/' ;
    nWidth = 352;
    nHeight = 240;
    sFilename = 'seq.yuv';
    sFilename = strcat( sPath, sFilename );
        disp( sFilename );
    mLuma = fYUVRead( sFilename, nWidth, nHeight, 0, 0, 420 );
    %%%% DCT Histogram
    vResult = blkproc( mLuma, [8 8], 'fDCT' );
    vResult = vResult(:);
    vHist = tabulate( vResult(vResult>2 & vResult<200 ) );
    figure;
    bar( vHist(:,1), vHist(:,2) )
    %%%% Repeat for Haar Histogram
    vResult = blkproc( mLuma, [8 8], 'fHaar' );
    vResult = vResult(:);
    vHist = tabulate( vResult(vResult>2 & vResult<200 ) );
    figure;
    bar( vHist(:,1), vHist(:,2) )
return
Functions fDCT( ) and fHaar may be used in estimating $F_{ij}$
(fDCT.m) =
    function v = mydct( mBlock );
    v = [ 0 0 0 ];
    F = round( dct2( mBlock ) );
    if F(1,2)
        v(1) = F(1,2);
    end
    if F(2,1)
        v(2) = F(2,1);
    end
    if F(2,2)
        v(3) = F(2,2);
    end
return
```

The functions performed by the diagrams of FIGS. 1-10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of noise reduction of an input signal, the method comprising:
   calculating a plurality of transform coefficients corresponding to each of a plurality of blocks in said input signal at baseband;
   calculating a plurality of histograms, wherein each histogram in the plurality of histograms corresponds to a different set of transform coefficients calculated for different block sizes and offsets;
   calculating a plurality of quantization parameters based on said transform coefficients, wherein at least one of the plurality of quantization parameters corresponds to each respective one of the plurality of blocks in said input signal, wherein calculating the plurality of quantization parameters is further based on a separation of peaks of one of the plurality of histograms; and
   generating an output signal by noise filtering said input signal based on the calculated plurality of quantization parameters.

2. The method according to claim 1, wherein said calculating of said quantization parameters is further based on a subset of said transform coefficients comprising a plurality of lowest frequency AC coefficients in each of said blocks.

3. The method according to claim 1, further comprising:
   calculating a plurality of sizes of said blocks, wherein at least two of said sizes are different from one another, and wherein the calculation of the plurality of quantization parameters is further based on the sizes of said blocks.

4. The method according to claim 3, wherein said calculating of said quantization parameters is further based on one or more peak heights in said histograms, one of said peak heights corresponding to each respective one of said histograms.

5. The method according to claim 4, wherein (i) each of said separation of peaks is measured between a first peak in said respective histogram and a second peak in said respective histogram (ii) and each of said first peaks and said second peaks is offset from an origin of said respective histogram.

6. The method according to claim 4, wherein a gap is measured between an origin of said respective histogram and an initial peak in said respective histogram.

7. The method according to claim 1, wherein the calculating a plurality of transform coefficients and the calculating a plurality of quantization parameters is performed on each of a luminance component and two chrominance components of said input signal.

8. The method according to claim 1, wherein (i) said input signal comprises a video signal and (ii) said noise filtering comprises a mosquito noise reduction.

9. The method according to claim 1, wherein (i) said input signal comprises a video signal and (ii) said noise filtering comprises a deblock filtering.

10. The method according to claim 1, wherein (i) said input signal comprises a video signal and (ii) said noise filtering comprises a sharpness filtering.

11. An apparatus comprising:
    a first circuit configured to: (i) calculate a plurality of transform coefficients corresponding to each of a plurality of blocks in an input signal at baseband; (ii) calculating a plurality of histograms, wherein each histogram in the plurality of histograms corresponds to a different set of transform coefficients calculated for different block sizes and offsets; and (iii) calculate a plurality of quantization parameters based on said transform coefficients, wherein at least one of the plurality of quantization parameters corresponds to each respective one of the plurality of blocks in said input signal, wherein calculating the plurality of quantization parameters is further based on a separation of peaks of one of the plurality of histograms; and
    a second circuit configured to generate an output signal by noise filtering said input signal based on the calculated plurality of quantization parameters.

12. The apparatus according to claim 11, wherein said calculation of said quantization parameters is further based on a subset of said transform coefficients comprising a plurality of lowest frequency AC coefficients in each of said blocks.

13. The apparatus according to claim 11, wherein said first circuit is further configured to calculate a plurality of sizes of said blocks, wherein at least two of said sizes are different from one another, and wherein the calculation of the plurality of quantization parameters is further based on the sizes of said blocks.

14. The apparatus according to claim 13, wherein said calculating of said quantization parameters is further based on one or more peak heights in said histograms, one of said peak heights corresponding to each respective one of said histograms.

15. The apparatus according to claim 14, wherein (i) each of said separation of peaks is measured between a first peak in said respective histogram and a second peak in said respective histogram (ii) and each of said first peaks and said second peaks is offset from an origin of said respective histogram.

16. The apparatus according to claim 14, wherein a gap is measured between an origin of said respective histogram and an initial peak in said respective histogram.

17. The apparatus according to claim 11, wherein said calculation of said transform coefficients and said calculation of said quantization parameters are performed on each of a luminance component and two chrominance components of said input signal.

18. The apparatus according to claim 11, wherein (i) said input signal comprises a video signal and (ii) said noise filtering comprises a mosquito nose reduction.

19. The apparatus according to claim 11, wherein (i) said input signal comprises a video signal and (ii) said noise filtering comprises a deblock filtering.

20. The apparatus according to claim 11, wherein (i) said input signal comprises a video signal and (ii) said noise filtering comprises a sharpness filtering.

* * * * *